US005224717A

United States Patent [19]

Lowen

[11] Patent Number: 5,224,717

[45] Date of Patent: Jul. 6, 1993

[54] WALKING AID DEVICE

[76] Inventor: Amy E. Lowen, #18, 3806 27th Ave., Vernon, British Columbia V1T 9C9, Canada

[21] Appl. No.: 732,177

[22] Filed: Jul. 18, 1991

[30] Foreign Application Priority Data

Jul. 27, 1990 [CA] Canada ................................ 2022180

[51] Int. Cl.[5] .............................................. B62D 51/04

[52] U.S. Cl. ...................................... 280/1.5; 135/67; 135/73; 482/66; 297/5

[58] Field of Search .................................. 135/65-67, 135/71, 73; 482/66, 68; 297/5, 7; 280/1.5, 47.34

[56] References Cited

U.S. PATENT DOCUMENTS

| | | | |
|---|---|---|---|
| 3,165,314 | 1/1965 | Clearman et al. | 272/70.3 |
| 3,237,940 | 3/1966 | Johnson | 297/5 X |
| 3,273,888 | 9/1966 | Burns | 272/70.4 |
| 3,654,643 | 4/1972 | Clanan | 135/67 X |
| 4,094,331 | 6/1978 | Rozsa | 135/67 |
| 4,162,101 | 7/1979 | McCagie, Sr. et al. | 135/67 X |
| 4,187,869 | 2/1980 | Marchetti | 135/67 |
| 4,188,966 | 2/1980 | Palmer et al. | 135/67 |
| 4,226,413 | 10/1980 | Daugherty | 272/70.4 |
| 4,251,105 | 2/1981 | Barker | 135/67 X |
| 4,341,381 | 7/1982 | Norberg | 272/70.4 |
| 4,411,283 | 10/1983 | Lucarelli | 135/67 |
| 4,510,956 | 4/1985 | King | 135/67 |
| 4,748,994 | 6/1988 | Schultz et al. | 135/67 |
| 4,765,355 | 8/1988 | Kent | 135/67 |
| 4,800,910 | 1/1989 | Gamm | 135/67 |
| 4,907,794 | 3/1990 | Rose | 482/68 |
| 4,985,947 | 1/1991 | Ethridge | 482/68 X |
| 5,020,560 | 6/1971 | Turbeville | 135/67 |

FOREIGN PATENT DOCUMENTS

| | | | |
|---|---|---|---|
| 1247513 | 12/1988 | Canada | 155/11 |
| 1048148 | 11/1966 | United Kingdom | 482/68 |
| 2127705 | 4/1984 | United Kingdom | 482/68 |

*Primary Examiner*—Carl D. Friedman
*Assistant Examiner*—Lan M. Mai
*Attorney, Agent, or Firm*—Laubscher & Laubscher

[57] ABSTRACT

A walking aid device which allows the user to retain a full upright position while providing continuous support of a portion of the user's body weight and allow the user to easily maneuver the device. The device has wheels which support two side sections providing upper portions at approximately elbow height. A brace member joins the side sections and spaces the upper portions thereof at a transverse distance slightly greater than the person's body width. Armrests are attached to the upper portions and extend in the fore and aft direction so as to provide a rear elbow engaging portion with a forearm engaging portion extending forwardly from the elbow engaging portion and having an upright hand grip at the forward end thereof. A transverse rib-rest is provided between the arm-rest means adjacent the rear of the armrest. The brace member between the side sections may be located between rear legs of the side section and is located near the upper portion to allow free leg room when the user is positioned against the rib-rest behind the device. The area defined between the side sections and in front of the rib-rest may be entirely open to allow the user to enter the space between the side sections from what would normally be the front of the device.

32 Claims, 4 Drawing Sheets

WALKING AID DEVICE

FIELD OF THE INVENTION

This invention relates to a walking aid device, and more particularly to a device which is provided with wheels and is constructed to be utilized by an individual in a full upright position and with a portion of the person's weight being continuously supported.

DESCRIPTION OF THE PRIOR ART

A number of different types of walking aid devices, commonly known as walkers, have been developed. The most common type of walker is of the type which includes a plurality of interconnected legs with a pair of horizontal hand grip portions. This type of walker is usually constructed of relatively light weight material in order that the user can slide the device or slightly lift it and move it ahead step by step as the person walks generally behind it. Other more elaborate types have been developed, including those which have wheels for easier movement of the device. Many of the structures are designed so that the user generally carries most of his or her own full body weight, the device being used mainly for stabilizing the person and allowing the person to shift a portion of the body weight to the device during the stepping action. Modifications have been made to walkers so as to accommodate various forms of disability, and while some walking devices have been developed to assist persons who need to continuously relieve a portion of the person's body weight from the lower back or legs, known structures have either been of a considerably complicated nature or alternatively have not offered good mobility or maneuverability to the user.

SUMMARY OF THE INVENTION

It is an object of the present invention to provide a wheeled walking aid device which allows the user to maintain a full upright position while providing continuous support of a portion of the body's weight and also allows the person to easily maneuver the device.

According to the present invention, the device has a frame structure including two side sections each having spaced front and rear, substantially vertical, leg members rigidly joined by connecting means, the side sections having upper portions at approximately elbow height, and brace means joining the side sections and transversely spacing the upper portions thereof at a distance slightly greater than the person's body width. Ground engaging caster means are connected to each of the leg members for permitting rolling movement of the device. An armrest means is attached to each of the upper portions of the side sections and extend in the fore and aft directions, the armrest means defining an upper surface having a rear elbow engaging portion and a forearm engaging portion extending forwardly from the elbow engaging portion. Hand-grip means is located adjacent a forward end of the forearm engaging portion of the surface of each armrest means. A transverse rib-rest means is provided which extends between the upper portions of the side sections and is positioned rearwardly of the handgrip means

BRIEF DESCRIPTION OF THE DRAWINGS

In the accompanying drawings which show various embodiments of the invention.

DESCRIPTION OF THE PREFERRED EMBODIMENT

Figure 1:
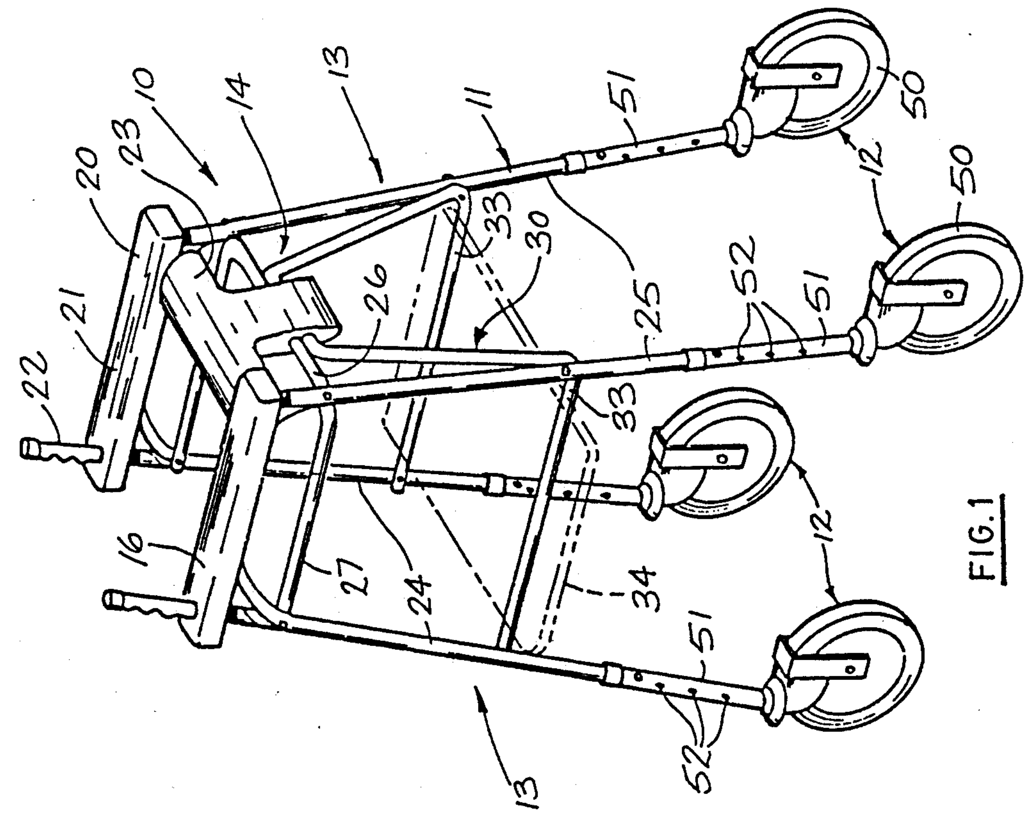
FIG. 1 is a front-side perspective view of one embodiment of the device of the present invention.

In FIG. 1, the reference character 10 denotes the wheeled walking aid device of the present invention. The device includes a general frame structure 11 mounted on ground engaging caster means 12. The frame structure 11 includes two side sections 13,13 joined by a transverse brace means 14, which in the present embodiment is disposed at the rear of the device. Mounted on upper portions 15,15 of the side sections 13,13 are armrest means 16,16. Each armrest means provides an upper surface 17 which has a rear elbow engaging portion 20. Extending forward from the rear elbow engaging portion 20 is a forearm engaging portion 21. Disposed forward of the forearm engaging portion 21 is a hand-grip means 22. A transverse rib rest means extends between the upper portions 15,15 of the side sections 13,13. As is apparent from FIG. 2, the upper portions of the side sections of the frame structure 11 are positioned substantially at elbow height so that when the user's elbow is positioned on the rear elbow engaging portion 20 of the arm rest with portion of the arm below the elbow in engagement with the forearm engaging portion 21, the user must be positioned in an entirely upright position. The rib-rest means 23 may be disposed, so that the top surface thereof is disposed in a plane slightly below the plane in which the upper surfaces 17 of the armrests 16,16 are disposed.

In the main, the members making up the frame structure 11, including the leg members 24 and 25, are formed of aluminum or chromed steel tubular stock, preferably of hollow circular cross sectional shape. The size of the tubular members and the material from which they are formed as well as the overall size of the structure may be selected, of course, based on the size and weight of the user. The armrests 16,16 and the rib-rest 23 may be formed with a rigid wood, plastic, or metal base member at least partially surrounded with a firm foam covered by a fabric or leatherette outer casing.

Each side section 13 of the frame structure 11 includes elongated front and rear leg members 24 and 25 respectively. The leg members may be substantially vertical but may be slanted slightly inwardly towards the upper portion both in the transverse and longitudinal direction of the device for the sake of increasing the stability of the device. The brace means 14 joining the side sections 13,13 is positioned between the upper portions 15,15 of the two side sections and includes a transversely extending rigid member 26. Each side section includes a horizontally disposed rigid member 27 affixed to the front and rear legs at the upper portion 15 of the side section. The two horizontally disposed rigid members 27,27 of the side sections may be formed integrally with the transversely extended rigid member 27 so as to form a U-shape member. The outer ends of the U-shape member is joined to the front legs and the point of connection between the side legs of the U-shaped member to the transverse portion being joined to the rear leg members 24,24 of the device.

The bracing means between the side sections 13,13 also includes an arch shaped member 30 having an upper portion thereof positioned between the rear leg members and near the upper portion of the side sections. Lower leg portions 32,32 of the arch shaped member 30 are connected to the opposed rear leg members 24 intermediate the length of the rear leg members. The connecting means between the front and rear leg members 24 and 25 also include lower horizontally disposed rigid members 33. The arch shaped member 30 and the lower horizontally disposed rigid members 33,33 may be formed as an integral member, the lower horizontally disposed rigid members 33,33 extending forwardly at 90° relative to the lower leg portions 32,32 of the arch shaped portion of the member 30.

Figure 2:
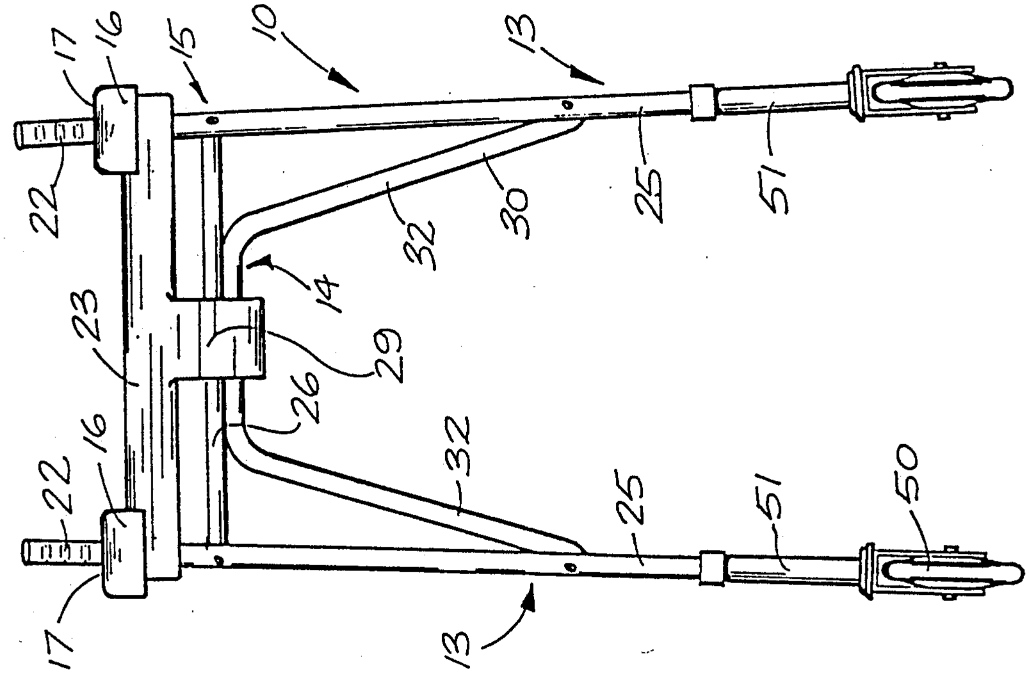
FIG. 2 is a rear view of the device shown in FIG. 1.

In the embodiment shown in FIG. 2, the upper part of the arch-shaped member 30 includes a straight horizontal portion disposed immediately under the transversely extended rigid member 26 and may be affixed thereto. The rib-rest means 23 which may at times take substantially all of the user's weight is shown as having a central depending portion 29 for transferring at least some of the weight to the bracing means 14. Alternatively, another transversely extending member (not shown) may be provided between the leg member 25,25 immediately below the rib-rest means so as to reinforce it.

The arch-shaped member 30*a* shown in FIG. 8 has a semi-circular upper portion, and it is positioned so that the uppermost part of the member is positioned immediately below the rib-rest means. It therefore provides a support for the central portion of the rib-rest means 23. The leg portions 32*a*,32*a* of the arch-shaped member 30*a* are secured to the rear leg members 25,25 of the opposite side sections 13,13 of the device. A rigid transverse member 26*a* is secured at opposite ends to the leg members 25,25, and because the arch-shaped member 30*a* is disposed in the same plane as the leg members 25,25, the mid portion of the transverse member 26*a* is bowed inwardly, i.e. it is located forward of the semi-circular upper portion of the arch-shaped member 30*a*. It may be seen that the brace means 14*a*, as represented by the arch-shaped member 30*a* and the transverse member 26*a*, like the brace means 14 of the previously described embodiment, provides free leg room thereunder and as well provides an effective, yet simple support, for the rib-rest 23.

Figure 3:
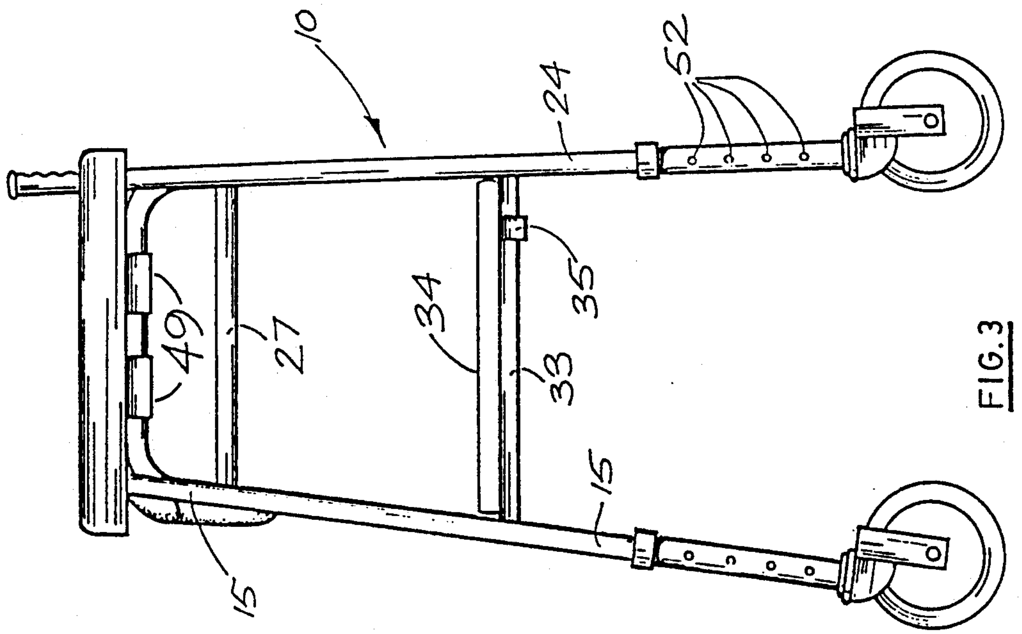
FIG. 3 is a side view of the embodiment of FIG. 1 but showing a seat member in place.

The lower horizontally disposed rigid members on the two side sections are at the same level, and a large flat board like member 34 which may be formed of wood or plastic, for example, is of sufficient length to rest on both of the lower horizontally disposed rigid members 33,33 and extend between the side sections 13,13 so as to provide a seat or shelf for the user of the device. The member 34 may have attaching means 35, such as clips, for detachably affixing the member 34 to the lower horizontally disposed members 33,33 so that the member 34 can be removed, and preferably, the attached means 35 are also adapted for affixing the member 34 to the horizontally disposed rigid member 27 and the lower horizontally disposed rigid member 33, whereby the member 34 can be carried at a vertically stored position on one side section when not in use. In addition to providing a seat, the member 34 may also be positioned as shown in FIG. 3 when the user is shopping, for example, so as to provide a shelf on which items or a basket may be carried.

It may be noted, therefore, that because of the positioning of the arch shaped member 30, there are no brace means in the central portion of the area between the rear legs so that when the user is walking behind the walking aid device with the elbows positioned on the elbow engaging portions of the armrest and grasping the hand-grip means, the user's legs can swing well forward without engaging any brace means. In the embodiment shown in FIG. 1, the transverse brace means 14 is disposed only between the rear legs 25,25 which means that the area between the side sections in front of the rib-rest means 23 is opened in order that the user may enter the area between the side sections from the front of the device and use the device by moving in the direction opposite to that which would normally be considered to be the forward direction.

The hand-grip means 22 are shown as individual elements having an upwardly projecting portion of a size which may be readily gripped by the hand when the elbow of the user is positioned at the elbow engaging portion 20 of the armrest 16. Each element forming the hand-grip means 22 may also have a downwardly projecting portion so that by leaving the upper ends of the tubular members which form the leg member open, the downwardly projecting portions 45,45 of the hand-grip means may be received in the upper ends of the front leg members 24,24 for firmly locating the hand grip means at their appropriate locations. The rear leg members 25,25 may also have the upper ends thereof left open in order that when the user wishes to use the device for travelling in the reverse direction, the hand-grip elements may be removed from the front legs and inserted into the upper ends of the rear legs through openings in the armrests.

The caster means 12 include full swivel wheels having an upwardly projecting tubular section 51 which is received within the lower ends of the tubular leg members. It is preferable that the wheels 50 be relatively large so that they are not encumbered by small irregularities on the ground or floor surfaces. The device may include at least two sets of caster means, the wheel size of one set of caster means being larger than the other so that the caster means may be interchanged, for example, to use the set with the larger wheels when the device is being used outside. Preferably the telescopic relationship of the upwardly extending tubular section 51 of the caster means and lower ends of the tubular leg members is such that the caster means are usually in a set position relative to axial displacement but may be readily released for removal. For example, one of the members, such as the tubular section 51, may have an opening 52 therein and the other may have a spring loaded detent (not shown) for reception in the opening 52 to lock the caster means to the lower end of the leg member.

It is important, when the wheels 50 are changed, or because of the user having a preference to have a different height setting of the upper portions of the device when using the walking aid device for different purposes, or due to different conditions of the user's body, to adjust the affective lengths of the legs. This again may be accomplished by the interconnection between the caster means and the lower ends of the legs. For example, instead of there being one opening, there may be a series of openings 52 provided in one of the members so that the extension of the leg into the tubular section 51 of the caster means from the lower end of the leg member may be readily adjusted by moving the detent from one opening to another.

Figure 4:
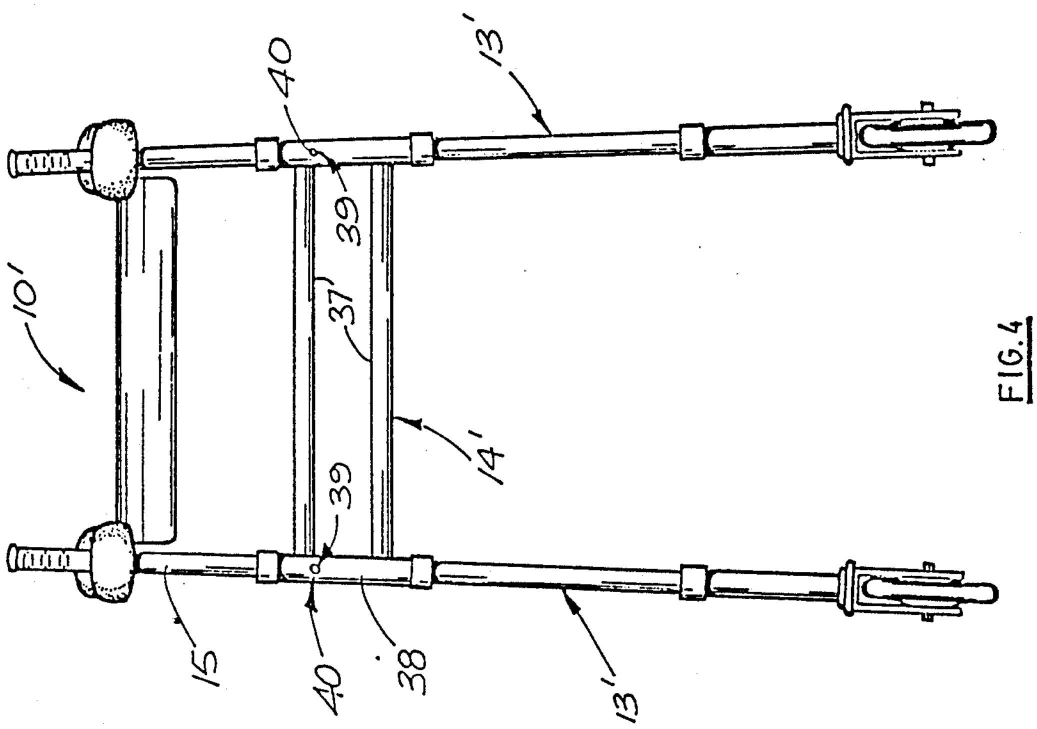
FIG. 4 is a front view of an alternative embodiment of the present invention.
Figure 5:
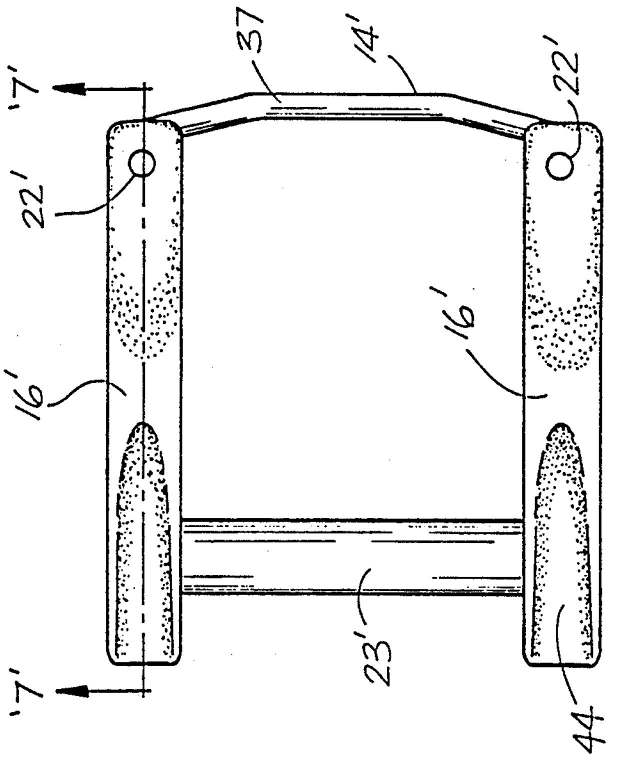
FIG. 5 is a top view of the embodiment shown in FIG. 4.
Figure 6:
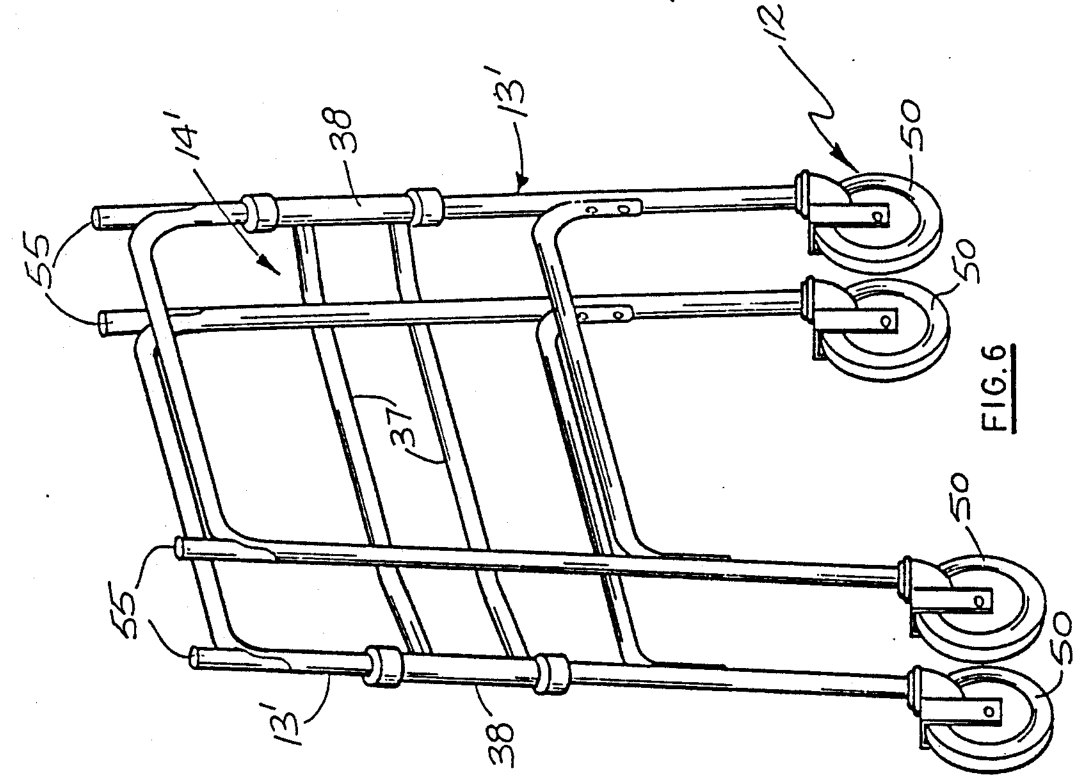
FIG. 6 is a perspective view of the embodiment shown in FIG. 4 but in a folded condition.

In the embodiment of the device 10' shown in FIGS. 4 to 6, the transverse brace means 14' between the two side sections is provided between the front legs. In the arrangement shown in this embodiment, the brace means 14' includes a pair of parallel transverse members 37 connected at opposite ends to means which can selectively allow swivel action between the brace means 14' and the side sections. Such means may include tubular sleeve members 38 which encompass the front leg members 24 and are normally affixed thereto by lock means 39. The lock means may be in the form of aligned transverse openings through the front leg members and the sleeves which receive a pin 40. When the pin is removed, each side section may in effect swivel relative to the transverse members 37 about a vertical axis so that the two side sections 13',13' and the transverse members 37 may be folded to the condition shown in FIG. 6. The sleeve members 38 and the leg members may have other transverse aligned openings which receive the pin 40 when the side members 13',13' have been swung to their folded condition so as to lock the side sections and the transverse members in the folded condition.

A connecting member 41 which is a connection between the front and rear leg of each side section provides means on the opposite side members for the connection of the rib-rest means 23', which may be located somewhat forward from the rear ends of the arm rest, preferably in the area between the rear of the arm rest 16',16' and the mid portions of the armrests (FIG. 5).

It may be readily seen that with the above described embodiments, the effective lengths of the legs are adjusted to that when the user is disposed behind the device, the user must stand in a fully upright position, possibly leaning slightly forward with the upper portion of the arm being substantially vertical and the forearm being substantially horizontal. The elbows are thereby positioned at approximately 90° whereby a significant portion of the weight of the user may be transferred through the upper arm and through the elbow and the adjacent forearms into the armrests. The hand-grips are preferably well located ahead of the elbow engaging portions of the armrest so that the user must fully extend the wrist portion and hands to comfortably grip the hand-grip means 22'. For the sake of comfort, the hand-grip means 22' may be grooved for the fingers and preferably have a non metallic covering, such as a rubbery material.

Figure 7:
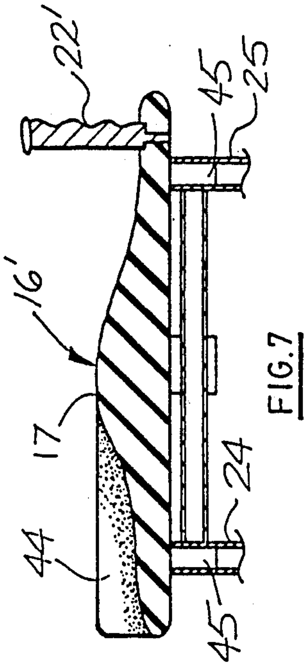
FIG. 7 is a cross sectional view as seen from the line 8—8 of FIG. 5 showing the arm rest mounted on a slightly modified form of frame structure of the device of the present invention.
Figure 8:
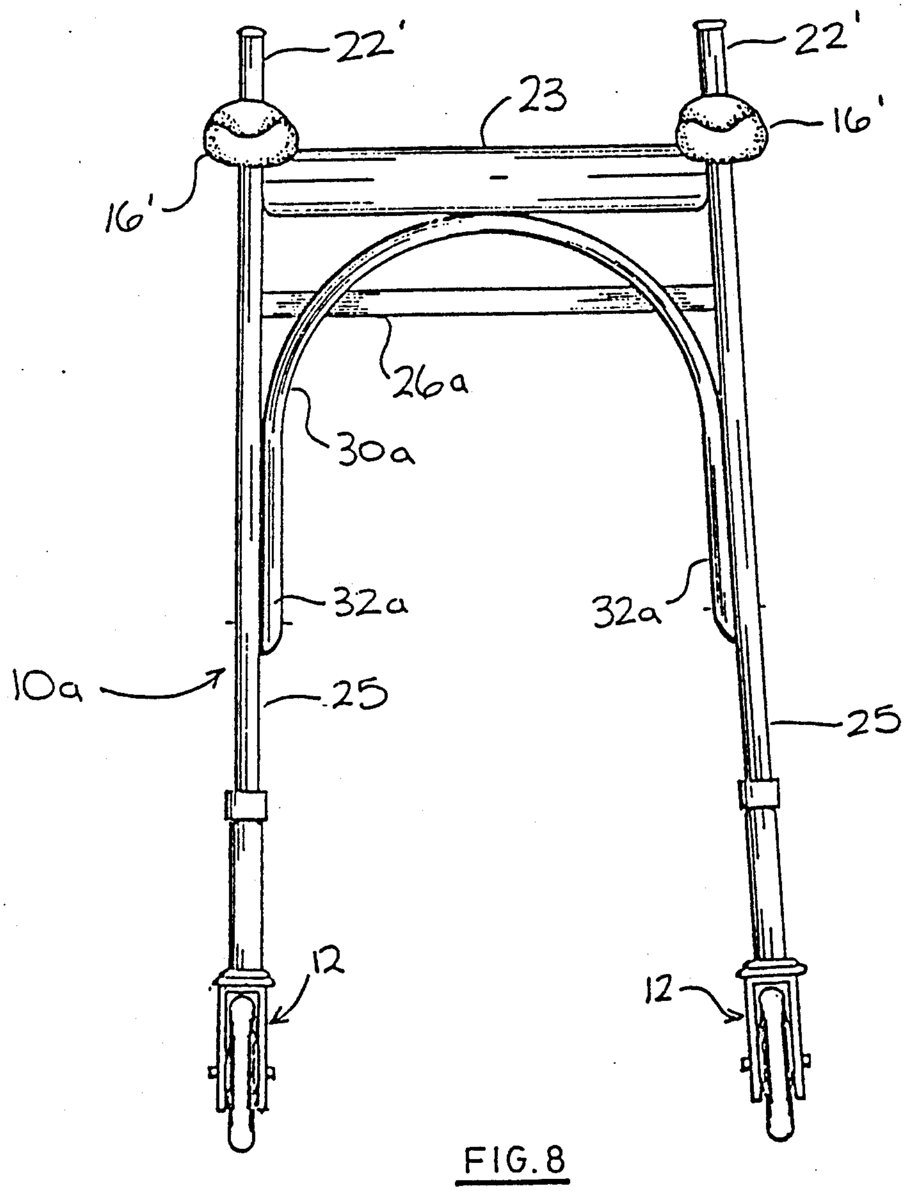
FIG. 8 is a view similar to FIG. 2 but showing an alternative bracing structure between the side sections of the device.

There is shown in FIGS. 7 and 8 a preferred form of armrest means 16' wherein the upper surface 17' defines an elbow receiving groove 44 extending downwardly from the top surface of the armrest for receiving the elbow and thus forming the elbow engaging portion of the armrest means. The surface forming the bottom of the groove rises towards a groove termination point which is intermediate the ends of the armrest so that the groove becomes shallower towards the front of the armrest and eventually terminates. Forward of the groove termination point, the upper surface of the armrest slopes forward toward the hand-grip which is shown as being formed integrally with the armrest. The embodiment shown in FIG. 7 is of a reversible type in that it includes a pair of downward projections 45 which are spaced to be received in the open upper ends of the front and rear leg members. Thus, the armrest 16' may be raised and removed, for example, when it is wished to fold the device, such as in the embodiment shown in FIGS. 4 to 6, or when the user wishes to be positioned in front of the device and to propel it in a direction which is opposite to the normal forward direction.

While reference is made above to providing open upper ends of the front leg members 24,24 and the rear leg members 25,25, it may be that the open end portions are in fact extensions 55,55 of the actual front and rear leg members, which extensions are separate members secured coextensively with the actual leg members. As is most apparent in FIG. 6, the front and rear leg members of each side section may in fact be formed from a single member bent to form a horizontal mid portion therebetween which can be positioned immediately below the armrests of that side section so as to form a more rigid structure. In the mounting arrangement of the armrests described above, the downwardly projecting portions 45,45 thus extend into the upper open ends of the extensions 55,55 (FIG. 6). The armrests may be provided with clips 49, such as those shown in FIG. 3, which attach to the horizontal portions immediately therebelow so as to ensure that the projecting portions 45,45 do not pull out of the open upper ends of the legs during use.

As described, the caster means 12 are preferably of a full swivel type and much of the maneuvering is done by applying pressure through contact of the elbow and the forearm with the armrest. In the embodiment of the armrest structure shown in FIGS. 7 and 8, more positive steering forces may be applied by the elbows which are contained within the grooves or pockets 44 forming the elbow engaging portions of the armrest means. This in conjunction with the hand-grips 22' allows for accurate steering of the device.

At least one of the wheels 50 may be provided with a brake means which has a brake positioned to lock rotation of the wheel about its horizontal axis. For example, brakes of the conventional toe-brake type may be used on the front wheels 50 of the caster means of the front legs 24 so that, for example, when the flat board member 34 has been placed to form a seat for the user, the device is prevented from rolling. Alternatively, a more elaborate braking system could be provided by a brake on one or more of the wheels, which brake (not shown) could be actuated through a cable from an actuated lever located in the area of the hand-grip means 22'.

Various alternatives within the spirit of the invention as defined in the apending claim will be obvious to those skilled in the art.

I claim:

1. A wheeled walking aid device for use by a person in a full upright position for continuously supporting a portion of the person's weight, said device comprising:

a frame structure including two side sections each having spaced front and rear, substantially vertical leg members rigidly joined by connecting means, said side sections having upper portions at approximately elbow height, and brace means joining said side sections and transversely spacing said upper portions thereof at a distance slightly greater than the person's body width, ground engaging caster means connected to each of said leg members for permitting rolling movement of said device, an armrest means attached to each of said upper portions of said side sections and extending in the fore and aft directions, said armrest means defining an upper surface having a rear elbow engaging portion and a forearm engaging portion extending forwardly from said elbow engaging portion, hand-grip means located adjacent a forward end of said forearm engaging portion of said surface of each armrest means, and a transverse rib-rest means extending between said armrest means and positioned rearwardly of said hand-grip means and disposed generally in the same plane as said armrest means.

2. A wheeled walking aid device as defined in claim 1, wherein said brace means includes a transversely extending rigid member connected between the side sections adjacent the upper portions thereof.

3. A wheeled walking aid device as defined in claim 2, wherein said connecting means of each side section includes horizontally disposed rigid members extending between said front and rear leg members adjacent said upper portion.

4. A wheeled walking aid device as defined in claim 3, wherein said rigid member forming said brace means and the rigid member forming the connecting means of each side section are integrally connected to form a U-shaped member having a pair of leg portions joined by a base portion, said base portion formed by said transversely extending member being connected between said rear leg members.

5. A wheeled walking aid device as defined in claim 3, wherein said connecting means further include lower horizontal rigid members joined at opposite ends to said front and rear leg members approximately mid-way between the length of the leg members, and further comprising a flat wide member connected to said lower horizontal rigid members for forming a seat between the side sections.

6. A wheeled walking aid device as defined in claim 5, wherein said flat wide member has connection means for disconnectable attachment to said lower horizontal members.

7. A wheeled walking aid device as defined in claim 3, wherein said armrest means are disposed substantially above said horizontally disposed members of each side section.

8. A wheeled walking aid device as defined in claim 7, said hand-grip means includes an upwardly projecting, substantially vertical portion at the opposite end of said armrest as said elbow engaging portion of said armrest means.

9. A wheeled walking aid device as defined in claim 8, wherein said upper surface of said armrest defines an elbow receiving central groove commencing at a rear end of said armrest and extending forwardly in the longitudinal direction of the armrest means.

10. A wheeled walking aid device as defined in claim 9, wherein a bottom surface within said groove rises in a forward direction whereby said groove becomes more shallow toward a groove termination point intermediate the ends of said armrest.

11. A wheeled walking aid device as defined in claim 10, wherein said surface of said armrest slopes downwardly from a high point at the groove termination point to said hand-grip means.

12. A wheeled walking aid device as defined in claim 2, wherein said brace means further includes a rigid arch shaped member having an upper portion thereof positioned between said rear leg members and leg portions thereof connected to said rear leg members intermediate the length of said rear leg members, whereby a major area between said rear leg members is open to provide a free leg area.

13. A wheeled walking aid device as defined in claim 12, wherein said transversely extending member is connected between said rear leg members and is connected intermediate the ends thereof to said upper portion of said arch shaped member.

14. A wheeled walking aid device as defined in claim 1, wherein said brace means joining said side sections is disposed only between said rear leg members whereby an area defined between said side sections and in front of the rib-rest means is entirely open from the front of the device.

15. A wheeled walking aid device as defined in claim 1, wherein said rib-rest means extends transversely between said side sections above said transverse member.

16. A wheeled walking aid device as defined in claim 1, wherein each hand-grip means is an upwardly projecting member.

17. A wheeled walking aid device as defined in claim 16, wherein each front leg member is formed of tubular material and has an open upper end, said hand-grip means having a downwardly projecting portion for securement within said open upper end.

18. A wheeled walking aid device as defined in claim 16, wherein said armrest means includes detachable connecting means for reversible connection of said armrest to said upper portion of said side section, whereby said armrest can be selectively mounted with said elbow engaging portion at the front of the device.

19. A wheeled walking aid device as defined in claim 18, wherein said hand-grip means is formed integrally with said armrest, wherein said leg members are of tubular form and have open upper ends, and wherein each armrest includes a pair of downward extending projections for reception in said open upper ends.

20. A wheeled walking aid device as defined in claim 1, wherein said rib-rest extends transversely between said armrests rearwardly of a midpoint of said armrests.

21. A wheeled walking aid device as defined in claim 20, wherein said rib-rest is disposed at a level slightly below said armrests.

22. A wheeled walking aid device as defined in claim 1, wherein said caster means include full swivel wheels.

23. A wheeled walking aid device as defined in claim 22, wherein said caster means include detachable connection means attaching said caster means to lower end portions of said leg members.

24. A wheeled walking aid device as defined in claim 23, wherein said caster means includes interchangeable wheel sets, the wheel diameter of one wheel set being different than wheels of a different set.

25. A wheeled walking aid device as defined in claim 23, wherein said leg members have adjust means for varying the height of said upper portion of said side sections.

26. A wheeled walking aid device as defined in claim 25, wherein said caster means includes upright projections, at least one of said lower end portion of said leg member or said projection being of hollow tubular form, said projection and lower end portion being telescoping received one within the other, and including locking means for selectively locking said lower end portion and projection against axial relative axial movement.

27. A wheeled walking aid device as defined in claim 26, wherein said locking means is provided with a plurality of locking positions thereby providing said means for varying the height of said upper portion of said side section.

28. A wheeled walking aid device as defined in claim 27, wherein one of said lower end portion or said projection having a series of axially spaced openings, said series extending in the longitudinal direction of the leg member, and the other including spring biased detent means for selected reception in any one of openings in said series for locking against relative axial movement between the lower end portion and the projection.

29. A wheeled walking aid device as defined in claim 22, wherein at least one of said wheels is provided with brake means for preventing rotation of said wheel.

30. A wheeled walking aid device as defined in claim 29, wherein said connecting means at each opposite end of said transverse bar means includes pivot means allowing a swinging movement of said side section about a vertical axis relative to said transverse bar means, lock means normally fixing said pivot means against said swinging movement and selectively movable to an unlocked condition for permitting movement of said side sections to a collapsed position.

31. A wheeled walking aid device as defined in claim 1, wherein said brace means includes a transverse bar means extending transversely between said front leg members and including connecting means between opposite ends thereof and each front leg member, said connecting means being positioned above a midpoint of the length of said leg members, said rib-rest being positioned rearwardly of a midpoint of said armrests.

32. A wheeled walking aid device as defined in claim 31, wherein said rib-rest means is provided with detachable connections for fixing opposite end thereof to said upper sections whereby said rib-rest may be removed when said side sections are swung to a collapsed condition.

* * * * *